United States Patent [19]

Koskan et al.

[11] Patent Number: 5,373,088
[45] Date of Patent: Dec. 13, 1994

[54] PRODUCTION OF POLYASPARTIC ACID FROM MALEIC ACID AND AMMONIA

[75] Inventors: Larry P. Koskan, Orland Park; Abdul R. Y. Meah, Justice, both of Ill.

[73] Assignee: Donlar Corporation, Bedford Park, Ill.

[21] Appl. No.: 188,539

[22] Filed: Jan. 28, 1994

Related U.S. Application Data

[63] Continuation-in-part of Ser. No. 947,712, Sep. 18, 1992, Pat. No. 5,296,578.

[51] Int. Cl.$^5$ .............................................. C08G 69/00
[52] U.S. Cl. ................................. 528/363; 525/418; 525/419; 525/420; 528/328
[58] Field of Search ................ 528/363, 328; 525/418, 525/419, 420

[56] References Cited

U.S. PATENT DOCUMENTS

| 5,286,810 | 2/1994 | Wood ................................. 525/421 |
| 5,288,783 | 2/1994 | Wood ................................. 525/418 |
| 5,292,864 | 3/1994 | Wood et al. ......................... 528/490 |
| 5,296,578 | 3/1994 | Koskan et al. ...................... 528/363 |

*Primary Examiner*—Morton Foelak
*Assistant Examiner*—Shelley A. Dodson
*Attorney, Agent, or Firm*—Olson & Hierl, Ltd.

[57] ABSTRACT

Polyaspartic acid is produced by thermal condensation of ammonium maleate derived from maleic acid and ammonia. Solid ammonium maleate in particulate form is heated to a temperature of at least about 170° C. to effect thermal condensation to a polysuccinimide which is then base hydrolyzed to a polyaspartic acid salt.

14 Claims, No Drawings

PRODUCTION OF POLYASPARTIC ACID FROM MALEIC ACID AND AMMONIA

CROSS-REFERENCE TO RELATED APPLICATIONS

This application is a continuation-in-part of copending application U.S. Ser. No. 07/947,712, filed on Sep. 18, 1992, now U.S. Pat. No. 5,296,578.

FIELD OF THE INVENTION

The invention relates to polymer formation. More particularly, the invention relates to manufacture of polyaspartic acid.

BACKGROUND OF INVENTION

Polyaspartic acid has been formed by a number of methods. U.S. Pat. No. 5,116,513 to Koskan et at. teaches the formation of polyaspartic acid by the thermal polymerization of aspartic acid. The polymerization produces a polysuccinimide, which is then base hydrolyzed to polyaspartic acid.

U.S. Pat. No. 4,839,461 to Boehmke teaches the production of polyaspartic acid by reacting maleic acid and ammonia in a molar ratio of 1:1 to 1.5 at the relatively low temperatures of 120°-150° C.

Mosig, "Kinetic and Thermal Characterization of the Hydrolysis of Polysuccinimide", Diplomarbeit Thesis, Clemson University, Clemson, S.C., April 1992, demonstrated that the rate of base hydrolysis of polysuccinimide to polyaspartate is dependent on hydroxide concentration and temperature, and that the temperature has a pronounced effect on the rate.

SUMMARY OF THE INVENTION

Polysuccinimide a precursor of polyaspartic acid, can be produced in unexpectedly high yields at elevated temperatures of at least about 170° C. by reacting maleic acid with ammonia in an aqueous medium. Maleic anhydride and ammonia are the usual starting materials to produce ammonium maleate which is then thermally condensed. The resulting polysuccinimide is base hydrolyzed to polyaspartic acid preferably using an alkali metal hydroxide, e.g., sodium hydroxide, and the like. While not a simple reaction, the hydrolysis generally follows an Arrhenius profile where the optimum temperature for the hydrolysis is about 70° C. At a temperature above about 80° C. ammonia can be stripped from the polymer.

The presently contemplated method of producing polyaspartic acid combines maleic acid and ammonia in an aqueous medium to produce an aqueous solution of an ammonium maleate, i.e., mono-ammonium maleate or di-ammonium maleate, depending upon the amount of ammonia present. Solid ammonium maleate is recovered from the aqueous solution, usually by evaporating the solution to dryness. The recovered solid ammonium maleate, preferably comminuted to a finely-divided powder form, is then heated to an elevated temperature of at least about 170° C. and maintained at that temperature for a time period sufficient to produce the polysuccinimide.

A preferred elevated temperature range for practicing the present invention is about 200° C. to about 260° C. A more preferred temperature range is about 220° C. to about 240° C.

The yield can be increased by increasing the reaction time. Generally, reaction time of about 6 to about 14 hours is preferred. More preferably, the reaction time is about 7 to about 10 hours.

Maleic acid and ammonia are present in the aforesaid aqueous medium in a mole ratio of at least about 1:1, usually in a respective mole ratio in the range of about 1:1 to about 1:12, preferably in a respective mole ratio of about 1:1 to about 1:5.

To hydrolyze, a suspension of polysuccinimide in water is made with vigorous mixing in order to wet the solids. Tank car caustic is the preferred hydrolysis base and is added to the suspension at a controlled rate. The hydrolysis reaction is monitored so that the pH value of the suspension averages about 9.5 and the temperature does not exceed about 80° C. The amount of base used for the hydrolysis is at least stoichiometric with respect to polysuccinimide present. Solution strengths from about 5 to about 50 weight percent are obtained with a preferred range of about 40 to about 45 weight percent solids. Analysis of the resulting polyaspartate by $C^{13}$ NMR spectroscopy shows a copolymer containing at least 50% $\beta$-conformation. A preferred range for the hydrolyzed polyaspartic acid product is about 70% to about 80% $\beta$-conformation.

DESCRIPTION OF THE PREFERRED EMBODIMENTS

A series of experiments, described below, were performed to determine the processing parameters for producing polysuccinimide from maleic anhydride or maleic acid and ammonia.

The presently contemplated process entails thermal polymerization by heating a solid, particulate ammonium maleate at an elevated temperature of at least about 170° C. for a time period sufficient to produce a polysuccinimide that can be hydrolyzed to polyaspartic acid. Hydrolysis can be effected by adding the produced polysuccinimide to an aqueous sodium hydroxide solution while maintaining the pH of the resulting admixture at a value of at least 9 or higher, preferably at about 9.5, until a substantially clear aqueous polyaspartic acid solution is obtained. In lieu of sodium hydroxide, other alkali metal hydroxides such as potassium hydroxide, can be utilized. Hydrolysis can also be carried out using alkaline earth metal hydroxides or carbonates.

These experiments utilized maleic anhydride as the starting material for reaction with ammonia. However, maleic anhydride equivalents such as maleic acid and its salts can be used as well, inasmuch as maleic anhydride readily converts to maleic acid in an aqueous medium. For purposes of this invention, the term "polyaspartic acid" as used herein includes also the salts of polyaspartic acid.

EXAMPLE 1

98 Grams of maleic anhydride (1 mole) were slurried with 50 grams of water and heated to about 55° C. for about 30 minutes in an oil bath. 68 Grams of 30% ammonium hydroxide in water were then added to the slurried maleic anhydride. The resulting mixture was heated for about four hours in an oil bath at a temperature of about 130° C. (a reaction mixture temperature of about 115° C.). The obtained product was tested, and produced a positive Biuret test for peptide. The obtained product was hydrolyzed. After hydrolysis, Gel Permeation Chromatography (hereinafter GPC) clearly showed that less than about 10% of any polymer was formed. Titration confirmed this result.

EXAMPLE 2

98 Grams (1 mole) of maleic anhydride were slurried with 50 grams of water and heated at about 75° C. for about 30 minutes in order to melt the maleic anhydride. The mixture was placed in water bath, cooled to room temperature, and 68 grams (1 mole) of 30 wt % aqueous solution of ammonium hydroxide were added dropwise to minimize ammonia loss during the resulting exotherm.

Upon completion of the ammonia addition, stirring was commenced. A temperature of 75°-85° C. was attained and was maintained for 2-3 hours. A glassy, white substance was produced as the product.

This product was transferred to a reaction vessel and heated in an oil bath to a reaction mixture temperature of about 115° C. (oil bath temperature—about 135° C.). During four hours of heating, water formation indicative of condensation reaction was observed. A brittle solidified product was obtained upon completion of the reaction and was hydrolyzed. After hydrolysis, GPC clearly showed the presence of a small amount of polymer. Titration showed about 20% polymer.

EXAMPLE 3

A portion of the glassy product obtained in Example 2 was ground. 15 Grams of the ground product were placed in a test tube and heated for 4-5 hours at a temperature of about 140° C. (oil bath temperature—about 150° C.). After heating, the produced substance was hydrolyzed. After hydrolysis, GPC data showed the presence of a polymer shoulder. Titration showed about 30% polymer.

EXAMPLE 4

15 Grams of ground product from Example 2 were placed in a test tube, heated to a temperature of about 170° C. (oil bath temperature—about 180° C.), and held at that temperature for about 5 hours. The produced substance was hydrolyzed. After hydrolysis, GPC data clearly showed about 50% polymer. Titration data confirmed this amount.

EXAMPLE 5

20 Grams of ground product from Example 2 were placed in a test tube and kept heated in an oil bath for about 5 hours at a temperature of about 220° C. The obtained product was water insoluble. Upon hydrolysis, GPC analysis of the obtained product evidenced a strong polyaspartic acid peak. Titration showed about 90% polymer.

EXAMPLE 6

98 Grams of maleic anhydride were slurried with 50 grams of water and heated at about 75° C. for about 30 minutes in order to melt the maleic anhydride. The mixture was placed in a water bath, cooled to room temperature, and 68 grams of 30 wt % aqueous ammonium hydroxide was added dropwise to minimize ammonia loss during the resulting exotherm.

Upon completion of the ammonia addition, stirring was commenced. A temperature of about 75°-85° C. was attained and was maintained for 2-3 hours. A glassy, white substance was produced as the product.

This product was transferred to a reaction vessel and heated to a reaction mixture temperature of about 110° C. (oil bath temperature—about 125° C.). The temperature was maintained for about four hours. During the four hours of heating, water formation indicative of condensation reaction was observed. A brittle solidified product was observed upon completion of the reaction and was hydrolyzed. Titration data showed less than about 5% polysuccinimide formation. No polymer in the hydrolyzed product was detected by GPC.

EXAMPLE 7

196 Grams (2 moles) of maleic anhydride were slurried with 100 grams of water and heated at about 75° C. for about 45 minutes in order to melt the maleic anhydride. The mixture was placed in a water bath, cooled to room temperature, and 204 grams (3 moles) of 30 wt % ammonium hydroxide in water was added dropwise to minimize ammonia loss during the exotherm.

Upon completion of the ammonia addition, stirring was commenced. A temperature of 75°-85° C. was attained and was maintained for about 6 hours. A glassy, white substance was obtained as the product.

This product was transferred to a reaction vessel and heated in an oil bath to a reaction mixture temperature of about 120° C. (oil bath temperature—about 135° C.). The heating was continued for fourteen hours. Water formation indicative of a condensation reaction was observed during heating. Upon completion of the reaction, a yellowish, hard material was obtained. Titration showed 0% polymer. GPC results were consistent with the titration.

EXAMPLE 8

196 Grams (2 moles) of maleic anhydride were slurried with 100 grams of water and heated to about 55° C. with stirring for about 45 minutes. The mixture was placed in a water bath, cooled to room temperature, and 405 grams (6 moles of 30 wt % aqueous ammonium hydroxide was slowly added with cooling to minimize ammonia loss. Upon completion of the addition, stirring was commenced and the mixture was heated to 75°-85° C. for about 6 hours. A white, glassy substance was obtained as the product. This obtained product was heated in an oil bath to a reaction mixture temperature of about 240° C. (oil bath temperature—about 250° C.) and held at that temperature for about 7 hours. A dark, yellow brittle product was obtained. Titration showed 100% polymer. This was confirmed by GPC of the hydrolyzed product.

In the Examples presented above, there was no strong experimental suggestion that polysuccinimide had been produced in significant amounts at temperatures less than 150° C. However, at temperatures of about 150° C. or lower a maleic anhydride/ammonia adduct, ammonium maleate, was formed. At elevated temperatures the produced ammonium maleate participated in a polymerization reaction. Once the 200° C. threshold was reached or surpassed, GPC and titration studies gave clear evidence of polysuccinimide formation. The observed yield was high, over about 70%. At temperatures above about 220° C. the yield attained the maximum of 100% of theoretical, and generally exceeded about 90% of theoretical. At temperatures above about 150° C., a yield of at least about 60% theoretical was obtained. At temperatures exceeding about 170° C., at least about 70% of the theoretical yield was obtained. At temperatures exceeding about 200° C. at least about 80% of theoretical yield was obtained.

EXAMPLE 9

Polysuccinimide (about 30 grams) was slurried in water (about 40 grams) and the slurry stirred. Caustic (about 25 grams of 50% wt/wt solution) was added to the stirred slurry at a rate so that the slurry temperature did not exceed about 80° C., and the pH value of the slurry did not exceed about 9.5. After the caustic addition was complete, sufficient water was added to provide a solids concentration of about 42 weight percent, constituted substantially by hydrolyzed polysuccinimide.

EXAMPLE 10

Softened water (about 287 pounds) was pumped into a 150-gallon stainless steel tank. The tank contents were stirred as polysuccinimide (about 381 pounds) was slowly introduced therein. Stirring of the tank contents was continued until a substantially uniform suspension was produced.

Thereafter, aqueous sodium hydroxide solution (about 317 pounds; 50% wt/wt) was pumped into the tank at a rate of about 1-2 gallons per minute. The suspension began to clear as the sodium hydroxide solution was introduced into the tank. The rate of addition of the sodium hydroxide solution was slowed down as the hydrolysis reaction came to completion as evidenced by a substantially clear solution being formed in the tank.

During addition of the sodium hydroxide solution, the tank contents were maintained at a temperature below about 80° C. by adding more water. Upon completion of the sodium hydroxide addition, the resulting solution had a pH value of about 9.5. The produced aqueous sodium polyaspartate solution had a solids content of about 42 weight percent.

The foregoing Examples and accompanying discussion are intended as illustrative, and are not intended to be limiting. Still other variations within the spirit and scope of this invention are possible and will readily present themselves to those skilled in the art.

We claim:

1. A method of producing polyaspartic acid which comprises the steps of:

combining maleic acid and ammonia in an aqueous medium to produce an aqueous solution of an ammonium maleate;

recovering solid ammonium maleate from said solution;

heating the recovered solid ammonium maleate to an elevated temperature of at least about 170° C., and maintaining the solid ammonium maleate at said elevated temperature for a time period sufficient to produce a polysuccinimide; and hydrolyzing the produced polysuccinimide to polyaspartic acid.

2. The method in accordance with claim 1 wherein said solid ammonium maleate is heated to an elevated temperature in the range of about 200° C. to about 260° C.

3. The method in accordance with claim 1 wherein said solid ammonium maleate is heated to an elevated temperature in the range of about 220° C. to about 240° C.

4. The method in accordance with claim 1 wherein the solid ammonium maleate is maintained at said elevated temperature for at least six hours.

5. The method in accordance with claim 1 wherein maleic acid and ammonia are present in said aqueous medium in a mole ratio in the range of about 1:1 to about 1:12, respectively.

6. The method in accordance with claim 1 wherein maleic acid and ammonia are present in said aqueous medium in a mole ratio in the range of about 1:2 to about 1:5, respectively.

7. The method in accordance with claim 1 wherein the recovered solid ammonium maleate is comminuted prior to said heating.

8. The polyaspartic acid produced in accordance with the method of claim 1.

9. The polyaspartic acid produced in accordance with the method of claim 2.

10. The polyaspartic acid produced in accordance with the method of claim 3.

11. A method of producing polyaspartic acid which comprises heating particulate, solid ammonium maleate to an elevated temperature of at least about 170° C. and maintaining the solid ammonium maleate at said elevated temperature for a time period sufficient to produce a polysuccinimide; and hydrolyzing the produced polysuccinimide to polyaspartic acid.

12. The method in accordance with claim 11 wherein said elevated temperature is in a range of about 200° C. to about 260° C.

13. The method in accordance with claim 11 wherein said elevated temperature is in the range of about 220° C. to about 240° C.

14. The method in accordance with claim 11 wherein the polysuccinimide is hydrolyzed by addition of aqueous sodium hydroxide solution.

* * * * *